(12) United States Patent
Stanek et al.

(10) Patent No.: US 11,785,652 B2
(45) Date of Patent: Oct. 10, 2023

(54) OPTICAL CODE PROVISIONING FOR CONTROL DEVICES

(71) Applicant: Brilliant Home Technology, Inc., San Mateo, CA (US)

(72) Inventors: Steven Stanek, San Mateo, CA (US); Jeremy Hiatt, San Mateo, CA (US)

(73) Assignee: Brilliant Home Technology, Inc., San Mateo, CA (US)

( * ) Notice: Subject to any disclaimer, the term of this patent is extended or adjusted under 35 U.S.C. 154(b) by 71 days.

(21) Appl. No.: 17/141,910

(22) Filed: Jan. 5, 2021

(65) Prior Publication Data

US 2021/0212133 A1 Jul. 8, 2021

Related U.S. Application Data

(60) Provisional application No. 62/957,298, filed on Jan. 5, 2020.

(51) Int. Cl.
| | |
|---|---|
| *H04W 76/11* | (2018.01) |
| *G06K 7/14* | (2006.01) |
| *H04W 84/18* | (2009.01) |
| *H04W 4/06* | (2009.01) |
| *H04W 4/80* | (2018.01) |
| *G06K 19/06* | (2006.01) |

(52) U.S. Cl.
CPC ........... *H04W 76/11* (2018.02); *G06K 7/1439* (2013.01); *G06K 19/06037* (2013.01); *H04W 4/06* (2013.01); *H04W 4/80* (2018.02); *H04W 84/18* (2013.01)

(58) Field of Classification Search
USPC ...................................................... 370/329
See application file for complete search history.

(56) References Cited

U.S. PATENT DOCUMENTS

| | | | |
|---|---|---|---|
| 2013/0191233 A1* | 7/2013 | Atkinson | G06K 19/06018 726/29 |
| 2013/0198858 A1* | 8/2013 | Atkinson | G06Q 20/202 726/27 |
| 2013/0219520 A1* | 8/2013 | Atkinson | G06Q 20/208 726/30 |
| 2014/0266669 A1* | 9/2014 | Fadell | H04W 4/80 340/501 |
| 2015/0256391 A1* | 9/2015 | Hardy | H04L 63/0876 709/222 |
| 2015/0293513 A1* | 10/2015 | Schlette | G05B 19/4183 700/86 |
| 2017/0280274 A1* | 9/2017 | Notohardjono | H04W 4/029 |
| 2018/0160284 A1* | 6/2018 | Lim | H04W 4/06 |
| 2018/0160301 A1* | 6/2018 | Kwon | H04W 4/06 |
| 2018/0181849 A1* | 6/2018 | Cassidy | G06K 7/1417 |

* cited by examiner

*Primary Examiner* — Hassan Kizou
*Assistant Examiner* — Oladiran Gideon Olaleye
(74) *Attorney, Agent, or Firm* — Zurvan Mahamedi

(57) ABSTRACT

A control device having a surface that is hidden after installation of the control device. The control device includes an optical code disposed on the surface. The optical code encodes a device identifier of the control device and a secret code. The control device includes a wireless transceiver configured to communicate with a user device during a provisioning sequence of events that is initiated based on the user device scanning the optical code to obtain the device identifier and the secret code.

17 Claims, 8 Drawing Sheets

OPTICAL CODE PROVISIONING FOR CONTROL DEVICES

RELATED APPLICATIONS

This application claims benefit of priority to Provisional U.S. Patent Application No. 62/957,298, filed Jan. 5, 2020; the aforementioned priority application being hereby incorporated by reference in its entirety.

TECHNICAL FIELD

This application relates to control devices, and more specifically, optical code provisioning for control devices.

BACKGROUND

Home control systems, such as lighting control systems used for lighting fixtures, include binary analog switches and analog dimmer switches that enable users to control one or more lights wired to an electrical box upon which such switches are connected. Furthermore, when a person wishes to activate or interact with home systems, the person typically must interact with an actual device of the system or a dedicated or universal remote control and manually create an environment comprising activated or dimmed lights, audio system output, visual system output (e.g., a television or digital picture frame output), temperature, and the like.

Provisioning is the process for securely connecting a wireless device to one or more trusted devices within a dwelling. Generally, this is done by placing a wireless device in a "provisioning mode" for a period of time. During the period of time, the wireless device is visible to and open for connection by any device. This presents a potential security hole. A common technique is to use a side channel, such as a code that is typed into a device or some form of written code. These techniques are problematic because codes can be lost and displaying a code requires a screen.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
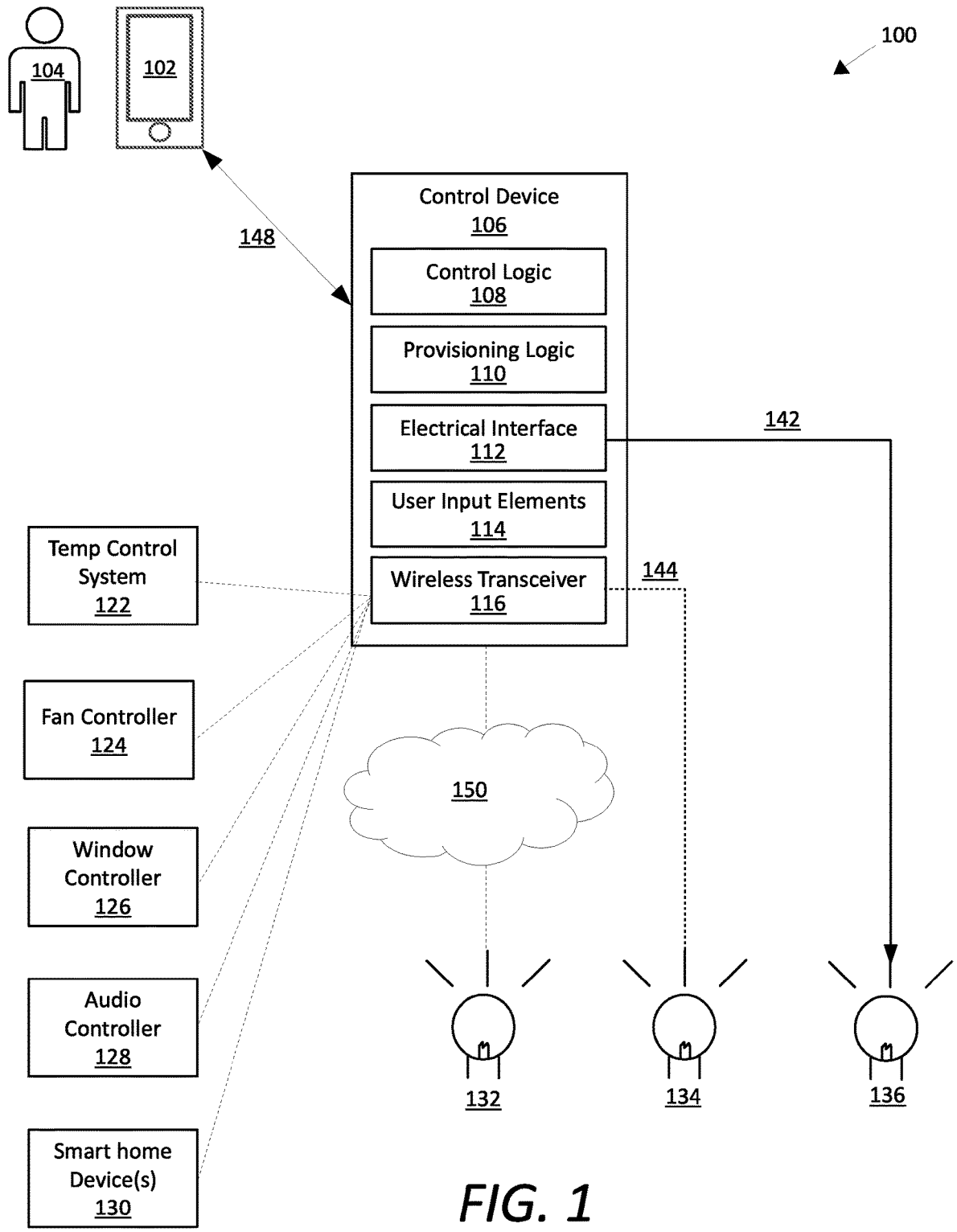
FIG. 1 illustrates a control system comprising a control device, according to one or more embodiments.

In various embodiments, a control device includes a surface that is hidden after installation of the control device. An optical code disposed on the hidden surface of the control device. The optical code encodes a device identifier of the control device and a secret code. According to some examples, the optical code is a Quick Response (QR) code. The control device includes a wireless transceiver configured to communicate with a user device during a provisioning sequence of events. The provisioning sequence is initiated based on the user device scanning the optical code to obtain the device identifier and the secret code. According to some examples, the secret code is an authentication code that is usable to authenticate the user device with the control device after the control device is identified using the device identifier during the provisioning sequence.

According to some examples, the control device has a base assembly. The base assembly may be configured to mount to a wall. For example, the control device may include a wall-mountable switch. The surface on which the optical code is disposed may be a surface of the base assembly of the control device. Still further, some examples provide for an exterior panel that hides the surface on which the optical code is disposed. For example, the exterior panel may couple with a base assembly comprising the surface to hide the optical code.

According to some examples, the control device includes logic configured to receive data from the user device after the provisioning sequence of events is carried out. For example, the control device may include control logic configured to receive wireless user input from the user device, and to generate wireless signals to control one or more connected devices in response to the user input. As another example, the control logic may be configured to receive user input from a user interface element of the control device, and to generate wireless signals to control one or more connected devices in response to the user input. The wireless signals may be transmitted to the connected device/s using a wireless transceiver.

According to some examples, the control device includes network logic configured to operate the control device as a member of a control network comprising one or more control devices and one or more connected devices. In some examples, the network logic is configured to operate the control device as a node in a mesh network after the provisioning sequence of events is carried out. In some examples, the wireless transceiver is a Bluetooth transceiver. For example, the network logic may be configured to operate the control device as a node in a Bluetooth mesh network.

In various embodiments, a computer-readable medium stores instructions that, when executed by a computing device comprising one or more processors, causes a computing device to present a user interface to scan one or more optical codes, scan an optical code disposed on a surface of a control device, interpret the optical code to obtain a device identifier and a secret code required to provision a control device associated with the device identifier, establish communication with the control device based on the device identifier and the secret code, and add the control device to a control network. In some examples, the control network corresponds to a dwelling. In some examples, the control network is a Bluetooth mesh network comprising one or more control devices.

According to some examples, establishing communication with the control device based on the device identifier and the secret code includes searching for the control device associated with the device identifier encoded by the optical code, contacting the control device associated with the device identifier, and providing the secret code encoded by the optical code to the control device associated with the device identifier.

According to some examples, the instructions, when executed by the computing device, further cause the computing device to generate one or more keys for the control device, and provide the one or more keys to the control device. For example, the one or more keys provided to the control device may include an application key and a network key.

According to some examples, the instructions, when executed by the computing device, further cause the computing device to generate a unicast address for the control device, and share the unicast address with one or more other devices in the control network.

Among other advantages, the examples described herein achieve a technical effect of streamlining installation and provisioning of a control device, and/or improving security measures during the provisioning of a control device. The optical code may include both a device identifier and a unique cryptographic token that are not readily interpreted without an optical scanning device, and which allow secure authentication of a control device. The techniques described herein may prevent malicious actors from eavesdropping or pairing with a control device to gain control or other access to a control device and/or a control system. Furthermore, the techniques described herein reduce the manual steps necessary to identify and/or authenticate devices during provisioning.

System Overview

FIG. 1 illustrates a control system comprising a control device, according to one or more embodiments. A control system 100 includes one or more control devices 106 and one or more connected devices 122-136. A control device 106 includes hardware and/or software components that manage one or more connected devices 122-136 in the control system 100. The control system 100 may include one or more of an industrial control system, a process control system, a warehouse control system, a building control system, a home control system, a home automation system, and/or any other system that includes connected devices that can be controlled and/or automated using one or more control devices 106.

In some embodiments, the control system 100 is associated with a dwelling or structure, and each control device 106 belonging to the control system 100 controls one or more connected devices 122-136 associated with the dwelling or structure. The one or more connected devices 122-136 may include a temperature control system 122, a fan controller 124, a window controller 126, an audio controller 128, and/or any other smart home device 130. Examples of smart home devices 130 include, but are not limited to, an appliance, a sprinkler system, an entertainment device, a security system, a lighting system, and other wireless-enabled devices in a home or building.

The control device 106 includes a wireless transceiver 116 that sends and receives wireless signals. For example, the wireless transceiver 116 may send or receive Wi-Fi signals, ZigBee signals, Z-Wave signals, Bluetooth signals, other wireless personal area network (WPAN) signals, radio signals, infrared signals, cellular signals, and/or other electromagnetic signals. In some embodiments, the control device 106 controls one or more wireless connected devices 122-134. For example the control device 106 may communicate with one or more wireless connected devices 122-134 using the wireless transceiver 116.

Alternatively and/or in addition, the control device 106 may control one or more connected devices via a wired connection 142. In some embodiments, the control device 106 may include an electrical interface 112 that couples to one or more load devices 136. For example, load device 136, such as but not limited to a lighting device, may be plugged or wired into a building's electrical system. In this case, the electrical interface 112 can receive a power supply line from the main of a building, and a load line that extends to the lighting device or other load device. The control device 106 can implement control operations via the electrical interface 112 to control the power output on the load line for the lighting device. For example, the control device 106 can use the electrical interface 112 to implement switching operations to turn load devices (e.g., lighting device) on or off, and/or to dim or adjust the power level of the load device.

In some embodiments, the control device 106 is a wall-mounted device that can replace one or more wired wall-mounted controllers in a building, such as but not limited to a switch, a dimmer, a garage door opener, an alarm system, a thermostat, a sprinkler system controller, a security system controller, and/or other wired wall-mounted controllers.

A provisioning device 102 adds the control device 106 to the control system 100 by provisioning the control device 106. In some embodiments, the provisioning device 102 is a computing device under control of a user 104, such as but not limited to a mobile device, a master controller device, or another computing device. The control device 106 may include provisioning logic 110 that utilizes the wireless transceiver 116 to communicate with the provisioning device 102 over a wireless provisioning connection 148. The control device includes an optical code disposed on the control device 106. The provisioning device 102 may initiate a provisioning sequence of events by scanning the optical code, which is described in greater detail hereinafter.

The control device 106 may include one or more user input elements 114 that allow one or more users 104 to control one or more connected devices 122-136 using the control device 106. For example, the control device 106 may include one or more switches, buttons, sliders, touch screens, touch-sensitive sensors, or other user input elements 114. The control logic 108 of the control device 106 may process input signals obtained from the user input elements 114 to determine one or more control actions with respect to one or more connected devices 122-136. The control logic 108 can carry out the determined control action/s, such as by sending electronic signals over the wired connection 142 to a wire-connected or load device 136 via the electrical interface 112, and/or by sending wireless control signals to one or more wireless devices 122-134 via the wireless transceiver 116.

In some embodiments, the control device 106 may receive wireless user input from a user device, such as but not limited to the provisioning device 102. For example, a user 104 may use the provisioning device 102 to connect to and remotely control the control device 106. The control logic 108 of the control device 106 may process such wireless user input to determine and carry out one or more control actions, such as by sending electronic signals over the wired connection 142 to a wire-connected or load device 136 via the electrical interface 112, and/or by sending wireless control signals to one or more wireless devices 122-134 via the wireless transceiver 116.

In some embodiments, the control device 106 communicates with one or more wireless devices 122-134 using a direct wireless connection 144. For example, the control device 106 may set up and use a direct wireless connection 144 with a particular wireless device 134 to control the particular wireless device 134. The particular wireless device 134 may be paired directly with the control device 106, allowing the control device 106 to send wireless control signals to the particular wireless device 134.

Alternatively and/or in addition, the control device 106 communicates with one or more wireless devices 122-134 using a wireless device network 150. In this case, the control device 106 and a particular wireless device 132 both belong to the wireless device network 150. The control device 106 may use a protocol of the wireless device network 150 to communicate with the particular wireless device 132.

In some embodiments, provisioning is the process of adding a device to the wireless device network 150. Once provisioned, the control device 106 can communicate with other devices that belong to the same wireless device network 150, which may include one or more connected devices 122-134, one or more other control devices, one or more user devices (such as but not limited to provisioning device 102), and/or other devices that belong to the wireless device network 150. In some embodiments, the wireless device network 150 is a mesh network, such as but not limited to a wireless mesh network. For example, the wireless device network 150 may be a Bluetooth mesh network.

In some embodiments, provisioning is the process of associating a device to an entity, such as but not limited to a dwelling or structure. Once provisioned, the control device 106 can communicate with other devices that are associated with the same entity, including one or more connected devices 122-134, one or more other control devices, one or more user devices (such as but not limited to provisioning device 102), and/or other devices that are associated with the same entity. In some examples, associating a device to an entity includes adding the device to a wireless device network 150 associated with the entity.

One or more wireless devices 122-134 may be added to the wireless device network 150 through a provisioning process, making the wireless devices 122-134 available to one or more control devices 106. In some embodiments, one or more wireless devices 122-134 include an optical code that allows a provisioning device 102 to scan and initiate the provisioning sequence of events for the corresponding device in order to add the corresponding device to the wireless device network 150.

Mountable Base Assembly

Figures 2A, 2B:
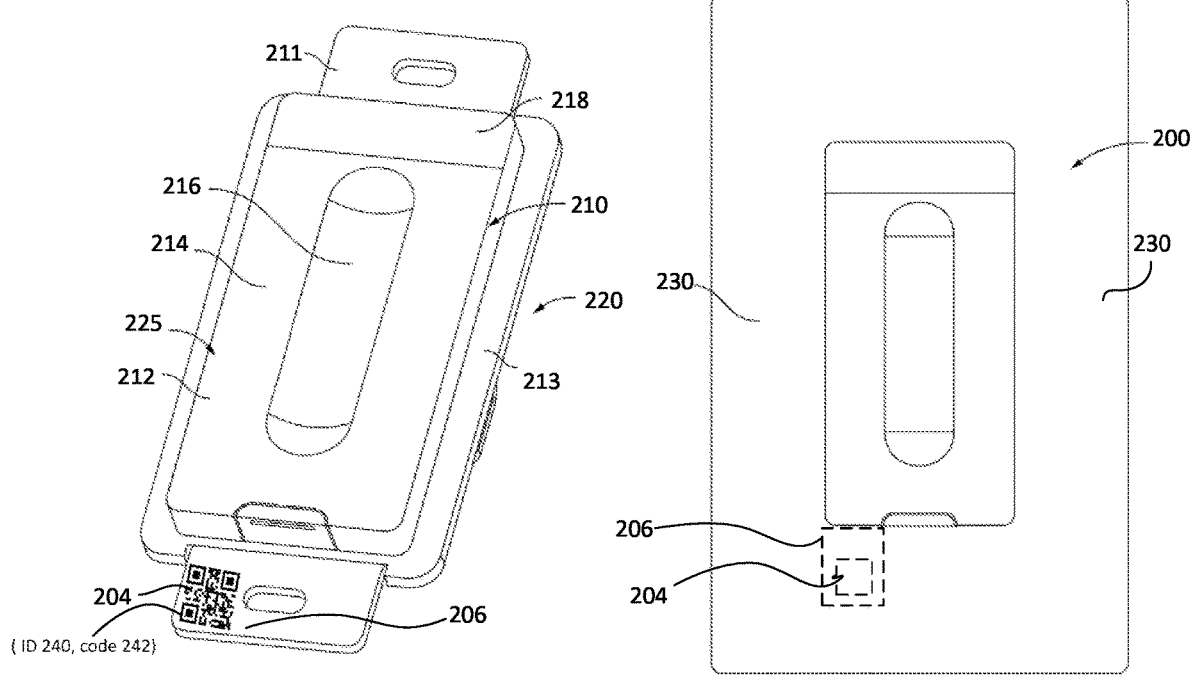
FIG. 2A is a front isometric view of a base assembly of a control device, according to one or more embodiments.
FIG. 2B illustrates a control device with a hidden optical code in a mounted or installed state.

In some examples, the control device 106 is a mountable device with an optical code disposed on a surface that is hidden after installation of the control device 106. FIG. 2A is a front isometric view of a base assembly of a control device, according to one or more embodiments. As shown in FIG. 2A, the base assembly 220 is not installed or mounted. In this state, an optical code 204 can be provided or made accessible to a user for purpose of provisioning the control device 200. As shown with FIG. 2B, the optical code 204 can be provided on, for example, a surface 206 of the control device 200 that is subsequently hidden once mounting and/or installation of the control device 200 is complete. Accordingly, the optical code 204 can be provided on a surface that is anticipated to be hidden upon mounting and/or installation of the control device 200. In variations, the optical code 204 can be provided on a location of the control device 200 that is accessible when the control device 200 is in an uninstalled and/or un-mounted state.

The base assembly 220 of a control device 200 includes mounting plates 211 to secure the structure to an underlying wall. The mounting plates 211 can receive, for example, fasteners that mechanically secure the base assembly 200 to an underlying wall as part of an installation process. In some embodiments, the base assembly 220 is structured to enable the control device 200 to operate as a light switch such that the base assembly 220 is mountable to a standardized electrical box typically deployed in electrical systems of dwellings and other buildings. For example, a portion of a housing 210 of the base assembly 220 can fit within an electrical box that is positioned within a wall of a building. The housing 210 can include wiring and other electrical elements to enable the control device 200 to interface with a building's electrical system, via wiring (e.g., load line, power supply line, ground, neutral) provided at the electrical box.

The base assembly 220 includes electronic components, such as a printed circuit board (PCB), one or more types of sensors, and/or electrical elements to interface with, for example, wiring or electrical outlets of the dwelling or mounted environment. The base assembly 220 can include, for example, a PCB on which processing resources and other hardware components (e.g., integrated circuits) can be provided or utilized. The processing resources and/or hardware components can be used to provide, for example, control logic (e.g., control logic 108) for controlling one or more connected devices (e.g., connected devices 122-136) and provisioning logic (e.g., provisioning logic 110) for participating in a provisioning sequence of events that provisions the control device 200. The base assembly can further include one or more wireless transceiver(s) (e.g., wireless transceiver 116) for enabling wireless communications with another device (e.g., provisioning device, controlled device, etc.). In some embodiments, the electrical wiring of a building's electrical system may power one or more electronic components of the base assembly 220 via, for example, an electrical interface that is retained within the base assembly 220.

OPTICAL CODE

The control device 200 includes an optical code 204 that is disposed on a surface 206 of the control device 200. For example, the surface 206 may be a surface of the base assembly 220 that is hidden after the control device 200 is fully installed. The optical code 204 is a representation of data that is encoded in a visual representation that is machine-readable. For example, the optical code 204 may include a linear barcode, a 2-dimensional matrix barcode, or any other visual representation of data. In some embodiments, the optical code 204 is a Quick Response (QR) code. The optical code 204 encodes data that includes a device identifier 240 and a secret code 242. Due to the encoding of the data, the data is not interpretable through any mechanism other than through optical scanning and recognition by a computing device, such as but not limited to a provisioning device (e.g., provisioning device 102). Practically, this can only be done by a user of the provisioning device, standing in front of the partially-assembled control device 200 when the control device 200 is not fully installed.

A provisioning device (e.g., provisioning device 102) scans and interprets the optical code 204 to obtain the device identifier 240 and the secret code 242. The provisioning device may be a smartphone, a scanning device, another mobile device, or another computing device capable of scanning the optical code 204. The provisioning device may include an optical device usable to scan the optical code 204, such as a barcode reader, a camera, or another optical device. In some embodiments, the provisioning device 102 captures an image of the optical code 204 using a camera. The provisioning device 102 interprets the captured image by applying image processing to the captured image.

The device identifier 240 uniquely identifies the control device 200 from other devices. In some embodiments, the device identifier 240 is a 48-bit Bluetooth device address, such as a 12-digit hexadecimal value. Possession of the device identifier 240 allows the provisioning device to find and establish wireless communication with the control device 200. The control device 200 may advertise its device identifier 240 in accordance with one or more protocols, such as but not limited to a Bluetooth Low Energy protocol. In some examples, the provisioning device discovers an unprovisioned control device during a Bluetooth Low Energy scan procedure.

The secret code 242 allows the control device 200 to verify that the provisioning device is a trusted device. Possession of the secret code 242 by the provisioning device is evidence that that provisioning device has access to view the internal surface of the control device 200 comprising the optical code 204 that is hidden after the control device 200 is fully installed. During a provisioning sequence of events, the provisioning device may wirelessly provide the secret code 242 to the control device 200. In some embodiments, the secret code 242 is an authentication code that the control device 200 requires before allowing provisioning to proceed. When the control device 200 receives the authentication code from the provisioning device, the provisioning device is authenticated with the control device 200.

In some embodiments, the provisioning device stores an application comprising instructions for carrying out provisioning on a computer-readable medium. In some embodiments, the application is a control application for managing a control system (e.g., control system 100), such as but not limited to a home automation system and/or a building automation system. When the application executes on the provisioning device, the provisioning device displays a user interface to scan one or more optical codes 204 on one or more devices that can be added to a control system, such as but not limited to the control device 200. Scanning the optical code 204 may initiate a provisioning sequence of events. In some embodiments, after the provisioning device scans the optical code 204, the application interprets the optical code 204 to obtain the device identifier 240 and a secret code 242. The application establishes communication with the control device 200 associated with the device identifier 240 using the secret code 242.

In some embodiments, one or more additional encoding techniques are used on the data before the data is transformed into the optical code 204 disposed on the surface 206 of the control device 200. For example, an encryption method may be performed using an encryption key on the plaintext data before the encrypted data is transformed into the optical code 204. In this case, only a provisioning device that has possession of the encryption key may interpret the optical code to generate encrypted data and decrypt the encrypted data using the encryption key to generate the original device identifier 240 and the secret code 242.

In some examples, the base assembly 220 includes an exterior panel 225 that includes one or more user interface elements that allow one or more users (e.g., user 104) to control one or more connected devices (e.g., connected devices 122-136) using the control device (e.g., control device 106, 200). For example, the user interface elements can include one or more touch input surfaces, such as shown by one or more touch panel regions 212, 214 and/or touch input groove 216. In variations, the user interface elements can include a display (e.g., touch-sensitive display), as well as buttons, switches, sliders, touch-based buttons and/or other actuators which require user contact. Still further, the exterior panel 225 can include a proximity sensing area 218 which can detect, for example, the presence of a person within a given proximity of the control device 200. The control logic (e.g., control logic 108) of the control device (e.g., control device 106, 200) may process input signals obtained from such user-interface elements to determine one or more control actions with respect to one or more connected devices (e.g., connected devices 122-136). A processing resource (e.g., processor 860) of the control device can receive the input signals from one or more user interface elements via sensors, sensing layers and/or electrical contacts.

Hidden Optical Code

FIG. 2B illustrates the control device 200 when mounted to a wall of a dwelling. In examples, the control device 200 can be mounted to a wall of a dwelling as part of an installation process. In some examples, the surface 206 (shown in phantom in FIG. 2B) comprising the optical code 204 (shown in phantom in FIG. 2B) is hidden by a faceplate 230 after the control device 200 is fully installed. The faceplate 230 can be mounted to the control device 200 and/or to the underlying wall as part of the installation process, thereby hiding the optical code 204. In either configuration, the faceplate 230 covers the underlying surface 206 and optical code 204 from view.

In some examples, during installation of one or more control devices 200 in a building, such as a dwelling or other structure, an installer installs one or more base assemblies 220 in the building, such as by mounting each base assembly into an electrical box of the building. The installer may wire each base assembly 220 into the electrical system of the building, such as by connecting an electrical interface of each base assembly 220 with the electrical wiring of the building's electrical system at a corresponding electrical box.

After installing the set of base assemblies 220 for a set of control devices 200, the installer may use a provisioning device (e.g., provisioning device 102) to provision the set of control devices 200 installed in the building. In some examples, the provisioning device is a mobile device executing a control application. The installer may use the provisioning device to scan the optical code 204 on each installed base assembly 220 and complete a provisioning sequence of events on the provisioning device for each base assembly 220. In some examples, after the base assemblies 220 are installed, the electrical system of the building powers the respective control device 200.

In some embodiments, provisioning the set of control devices 200 includes adding the set of control devices 200 to a wireless device network (e.g., wireless device network 150), associating the set of control devices 200 to an entity (e.g., the building, a user of the provisioning device, a user associated with the building, an account, etc.), and/or associating the set of control devices 200 with the provisioning device. The surface 206 with the optical code 204 is subsequently covered by the external panel 230 during the installation process, such that the optical code 204 is subsequently covered during normal operation of the control device 200 within the building or structure.

While examples of FIG. 2A and FIG. 2B illustrate the optical code 204 as being mounted to a portion of the mounting plate 211, in variations, the optical code 204 can include alternative locations. For example, as an addition or alternative, the optical code 204 can be provided on side flanges 213 of the base assembly 220, or on a rearward surface (not shown) of the base assembly 220. Still further, in other variations, the optical code 204 can be provided on an internal region of the base assembly 220, where the internal region 220 is accessible when the control device 200 is not installed. Still further, examples provide for the location of the optical code 204 to be on a surface or region that is specific to the form factor, installation components (e.g., use of faceplate) or functionality of the particular control device 100.

Provisioning a Control Device in a Control Network

Figure 3:
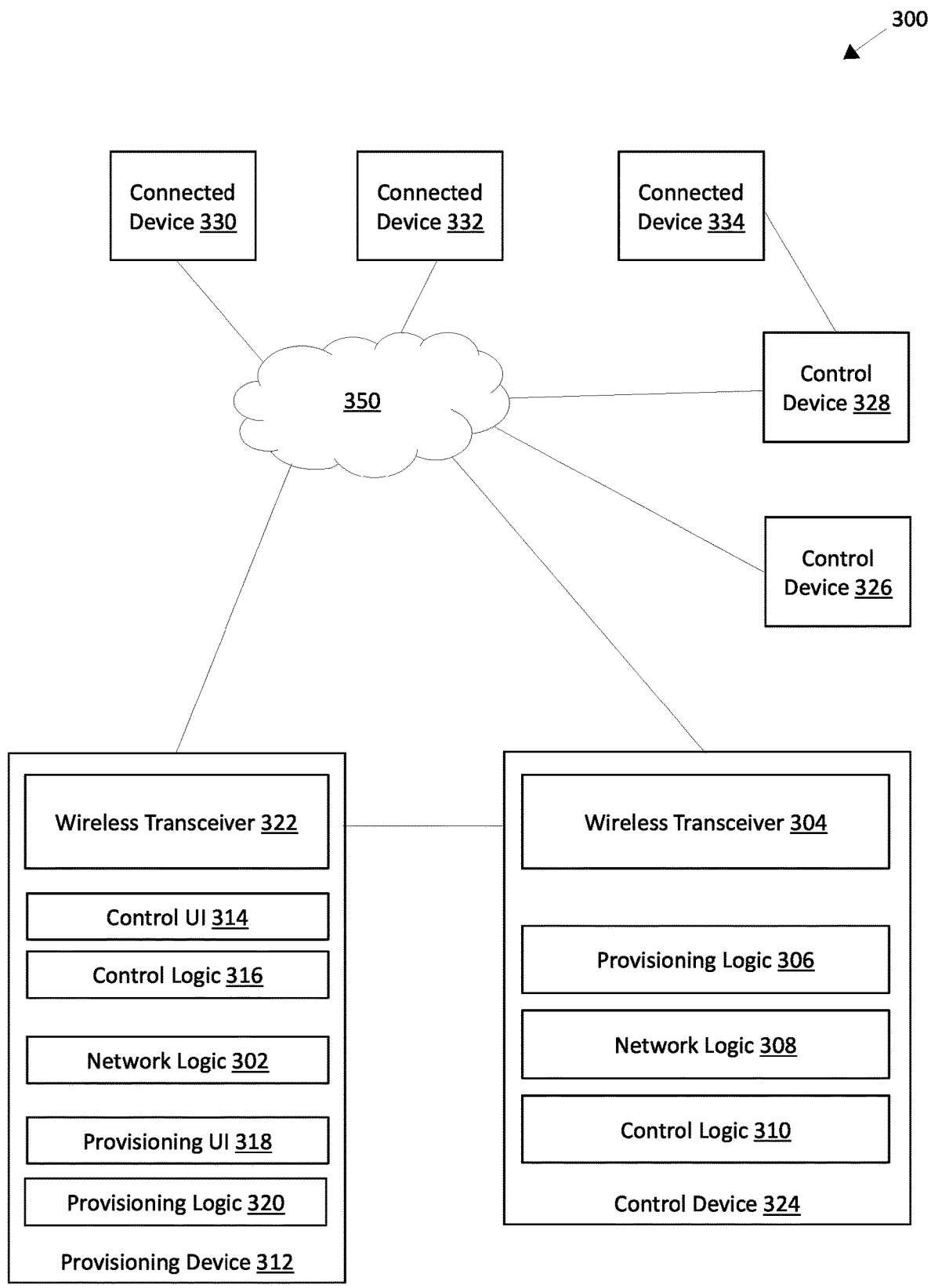
FIG. 3 illustrates a control system comprising a plurality of devices in a control network, according to one or more embodiments.

In some embodiments, provisioning includes adding one or more devices to a control network. FIG. 3 illustrates a control system 300 comprising a plurality of devices in a control network, according to one or more embodiments. A control system 300 includes a set of one or more connected devices 330-334 and a set of one or more control devices 324-328. The connected devices 330-334 and the control devices 324-328 belong to a control network 350. A control device 324-328 is added to the control network 350 by provisioning the control device 324-328. The control device 324 may include control logic 310 that controls one or more connected devices 330-334 in the control network 350 after the control device 324 is provisioned.

A provisioning device 312, such as a mobile computing device of a user (e.g., user 104) adds one or more devices to the control network 350. The provisioning device 312 may be a member of the control network 350. In some embodiments, the provisioning device 312 is capable of setting up a new control network 350, such as by creating the control network 350 and adding a device to the control network 350.

The provisioning device 312 may include provisioning logic 320 that provisions a control device 324. In some embodiments, the provisioning logic 320 at the provisioning device 312 presents a provisioning user interface 318 on the provisioning device 312 that allows a user of the provisioning device 312 to scan an optical code (e.g., optical code 204) disposed on a surface of the control device 324. The provisioning logic 320 interprets the optical code to obtain the device identifier (e.g., device identifier 240) and a secret code (e.g., secret code 242).

In some examples, the provisioning device 312 searches for the control device 324 based on the device identifier, contacts the control device 324 associated with the device identifier, and provides the secret code to the control device 324 for authentication. In this manner, a secure communication link may be established between the provisioning device 312 and the control device 324. For example, the provisioning device 312 may wirelessly communicate with the control device 324 and/or the control network 350 using a wireless transceiver 322, and the control device 324 may wirelessly communicate with the provisioning device 312 and/or the control network 350 using a wireless transceiver 304.

After the secure communication link is established between the provisioning device 312 and the control device 324, the provisioning device 312 proceeds to provision the control device 324 to add the control device to the control network 350. In some embodiments, the provisioning logic 320 of the provisioning device 312 interacts with the provisioning logic 306 of the control device 324 to exchange information necessary to add the control device 324 to the control network 350. For example, after the secure communication link is established, the provisioning device 312 may generate and/or exchange one or more keys with the control device 324 that allow the control device 324 to send and receive messages as a member of the control network 350.

For example, the provisioning device 312 may generate a device key for the control device 324. The device key is a unique security key possessed only by the provisioning device 312 and the control device 324. The device key allows for secure communication between the provisioning device 312 and the control device 324.

Alternatively and/or in addition, the provisioning device 312 provides a network key to the control device 324. In some examples, the network key is shared by all connected devices 324-332 that are members of the control network 350. Possession of the network key may define membership in the control network 350, allowing a control device 324 to communicate with other member devices 326-332 in the control network 350. If the control device 324 is the only provisioned device, the provisioning device 312 may generate a network key for the new control network 350.

Alternatively and/or in addition, the provisioning device 312 generates and/or provides an application key to the control device 324. An application key may correspond to a specific function of the control network 350. For example, if the control device 324 is configured to control a climate-control device, the provisioning device 312 may provide an application key corresponding to one or more climate-control devices that the control device 324 is authorized to access.

Alternatively and/or in addition, the provisioning device 312 generates and assigns a unicast address to the control device 324. The unicast address is a unique address within an address space of the control network 350. The provisioning device 312 may provide the unicast address of the control device 324 to the control device 324 and/or to one or more other member devices 326-334. The provisioning device 312 may also provide the control device 324 with one or more unicast addresses for one or more other member devices 326-332.

The control network 350 may be a wireless device network (e.g., wireless device network 150). In some embodiments, the control network 350 is a wireless mesh network, such as but not limited to a Bluetooth mesh network. In a wireless mesh network, one or more member devices, such as one or more control devices 324-328, function as nodes in a mesh topology. In some embodiments, the member devices of the control network 350 may include one or more connected devices 330-332. Member devices 324-332 in a mesh topology may directly, dynamically, and non-hierarchically connect to other member devices 324-332 to cooperate and route data from a source device to a destination device. For example, if a particular control device 324 sends a control message to a particular connected device 332, the control message may travel directly to the connected device 332 or via one or more other member devices 326-330.

A control device 324 may include network logic 308 that allows the control device 324 to function as a member of the control network 350 after the control device 324 is provisioned and added to the control network 350. For example, the network logic 308 may cause the control device 324 to send and receive messages to one or more other member devices 326-332 of the control network 350. In some embodiments, the network logic 308 causes the control device 324 to operate as a node in a mesh network after the provisioning sequence of events is carried out.

A provisioning device may provision one or more control devices 324-328. Alternatively and/or in addition, a provisioning device 312 may provision one or more connected devices 330-332 to add the connected devices 330-332 to the control network 350. In some examples, the connected devices 330-332 may include an optical code (e.g., optical code 204) that allows the provisioning device 312 to provision the connected devices 330-332 using one or more techniques described herein with respect to a control device (e.g., control device 106, 200, 324). When the control network 350 is a wireless mesh network, such connected devices 330-332 can each function as a member of the control network 350.

The provisioning device 312 includes provisioning logic 320 to provision one or more devices 324-328 and manage membership of devices in the control network 350. A control network 350 may be associated with one or multiple provisioning devices 312. In some embodiments, a provisioning device 312 may also include network logic 302 that allows the provisioning device 312 to function as a member of the control network 350. In some embodiments, in addition to provisioning logic 320, the provisioning device 312 may also include control logic 316 so that the provisioning device 312 can act as a controller for one or more connected devices 330-334 in the control network 350. For example, the control logic 316 of the provisioning device 312 may present a control user interface 314 that allows a user (e.g., user 104) of the provisioning device 312 to control one or more connected devices 330-334 directly and/or via one or more control devices 330-334.

Alternatively and/or in addition, a connected device 324 may be added to the control system 300 by pairing and/or otherwise connecting with a particular control device 328. When a connected device 334 is paired only with a particular control device 328 and is not a member of the control network 350, control of the connected device 334 requires involvement of the control device 328 to which the connected device 334 is paired. For example, a control device 324-326 and/or a provisioning device 312 may indirectly control the connected device 334 by sending a message to the corresponding control device 328.

Methodology

Figure 4:
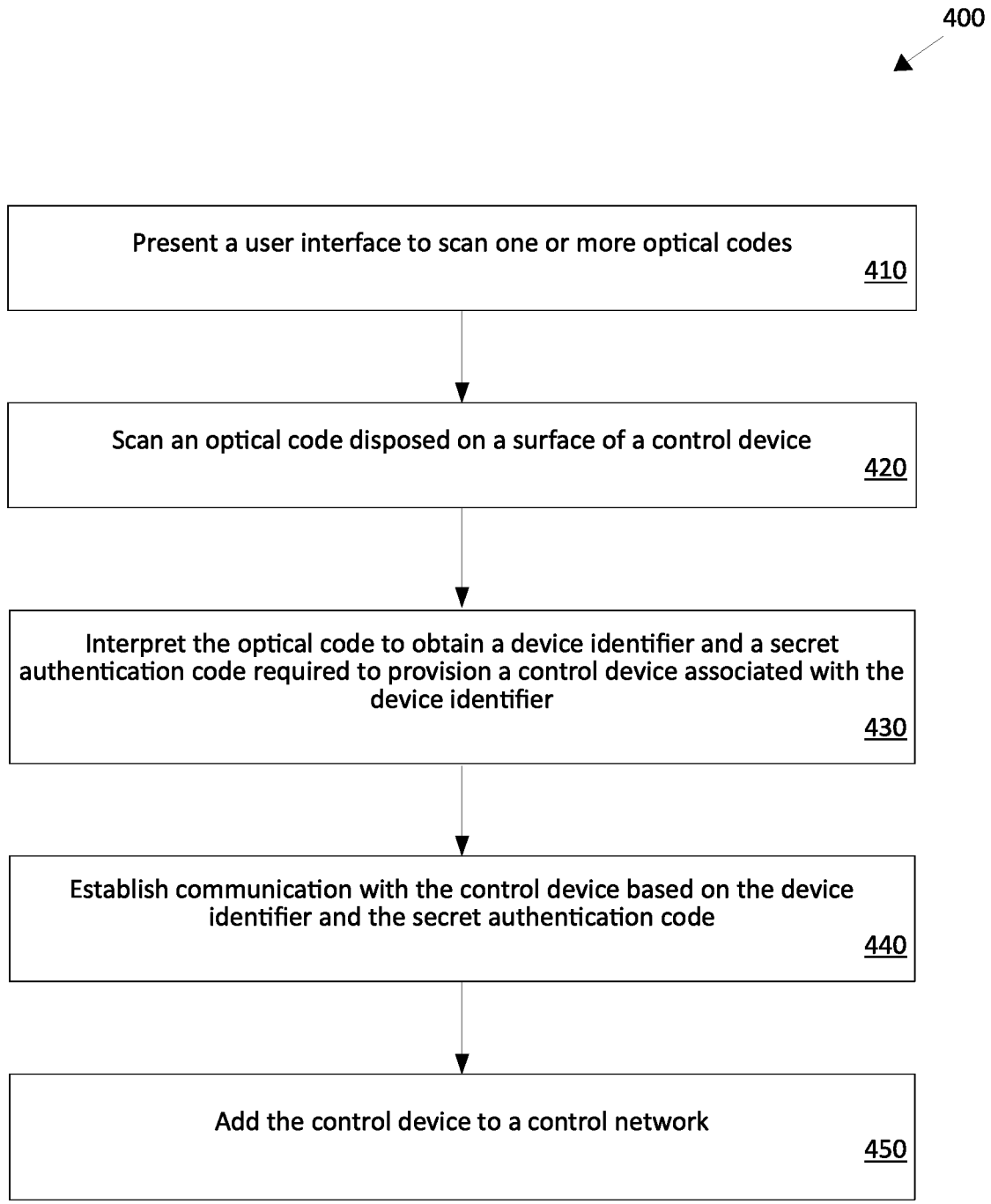
FIG. 4 illustrates an example method for provisioning a control device, according to one or more embodiments.

FIG. 4 illustrates an example method for provisioning a control device, according to one or more embodiments. Process 400 may be performed by one or more computing devices and/or processes thereof. For example, one or more blocks of process 400 may be performed by a computing device 850, such as but not limited to provisioning device 102 and/or provisioning device 312. In some embodiments, one or more blocks of process 400 are performed by an application executing on a mobile device. Process 400 will be described with respect to provisioning device 102 and control device 106 as an example, but is not limited to performance by provisioning device 102 or control device 106.

At block 410, the provisioning device 102 presents a user interface to scan one or more optical codes. At block 420, the provisioning device 102 scans an optical code (e.g., optical code 204) disposed on a surface of a control device 106. The optical code may be disposed on a surface of the control device 106 that is hidden after the control device 106 is fully installed. At block 430, the provisioning device 102 interprets the optical code to obtain a device identifier (e.g., device identifier 240) and a secret authentication code (e.g., secret code 242) required to provision a control device 106 associated with the device identifier.

At block 4400, the provisioning device 102 establishes communication with the control device 106 based on the device identifier and the secret authentication code. An example of block 440 is described in greater detail with respect to process 500 of FIG. 5.

At block 450, the provisioning device 102 adds the control device 106 to a control network (e.g., control network 350). In some embodiments, the provisioning device 102 generates and/or exchanges one or more keys with the control device 106 that allow the control device 106 to send and receive messages as a member of the control network.

Figure 5:
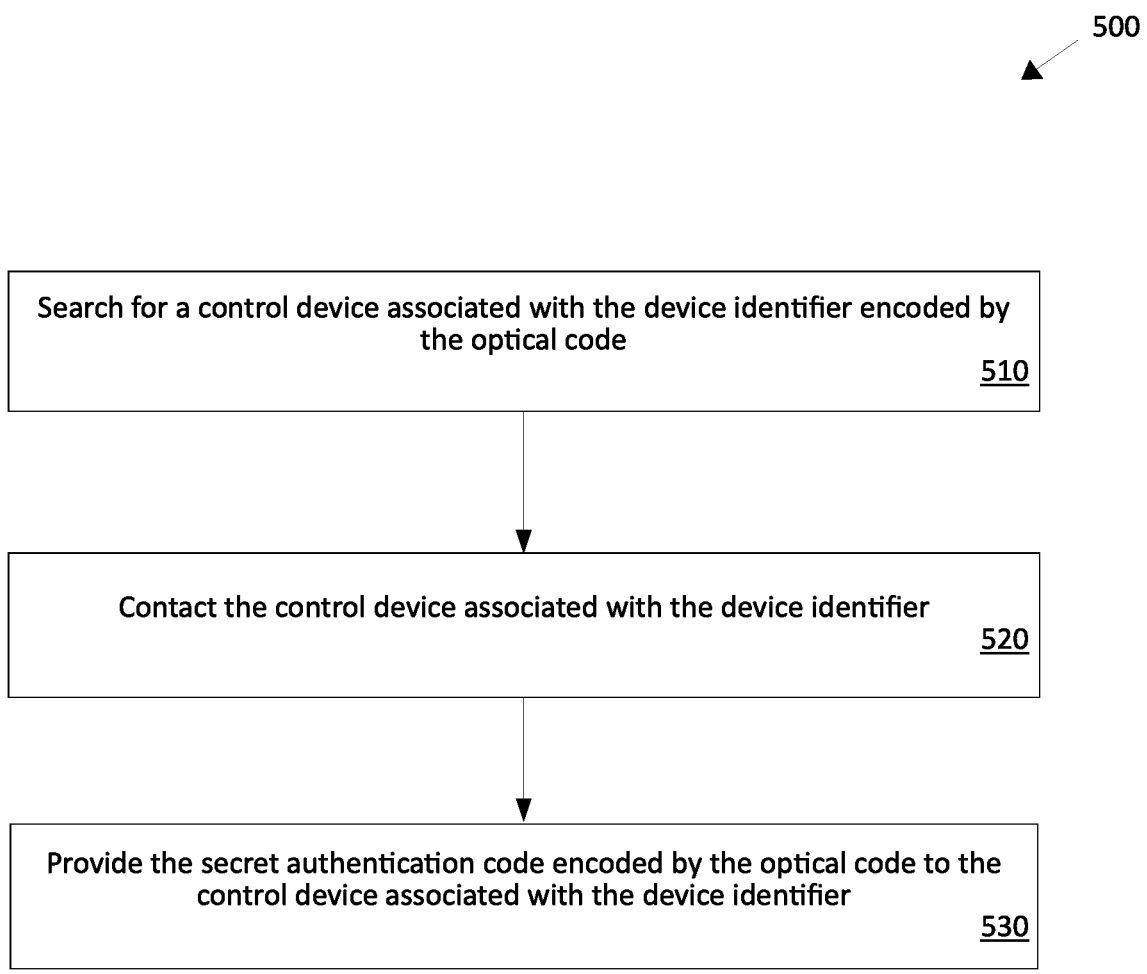
FIG. 5 illustrates an example method for establishing communication with a control device, according to one or more embodiments.

FIG. 5 illustrates an example method for establishing communication with a control device, according to one or more embodiments. Process 500 may be performed by one or more computing devices and/or processes thereof. For example, one or more blocks of process 500 may be performed by a computing device 850, such as but not limited to provisioning device 102 and/or provisioning device 312. In some embodiments, one or more blocks of process 500 are performed by an application executing on a mobile device. Process 500 will be described with respect to provisioning device 102 and control device 106 as an example, but is not limited to performance by provisioning device 102 or control device 106.

At block 510, the provisioning device 102 searches for a control device 106 associated with the device identifier (e.g., device identifier 240) encoded by the optical code (e.g., optical code 204). At block 520, the provisioning device 102 contacts the control device 106 associated with the device identifier. At block 530, the provisioning device 102 provides the secret authentication code (e.g., secret code 242) encoded by the optical code 204 to the control device 106 associated with the device identifier. Process 500 establishes a secure connection between the provisioning device 102 and the control device 106.

Figure 6:
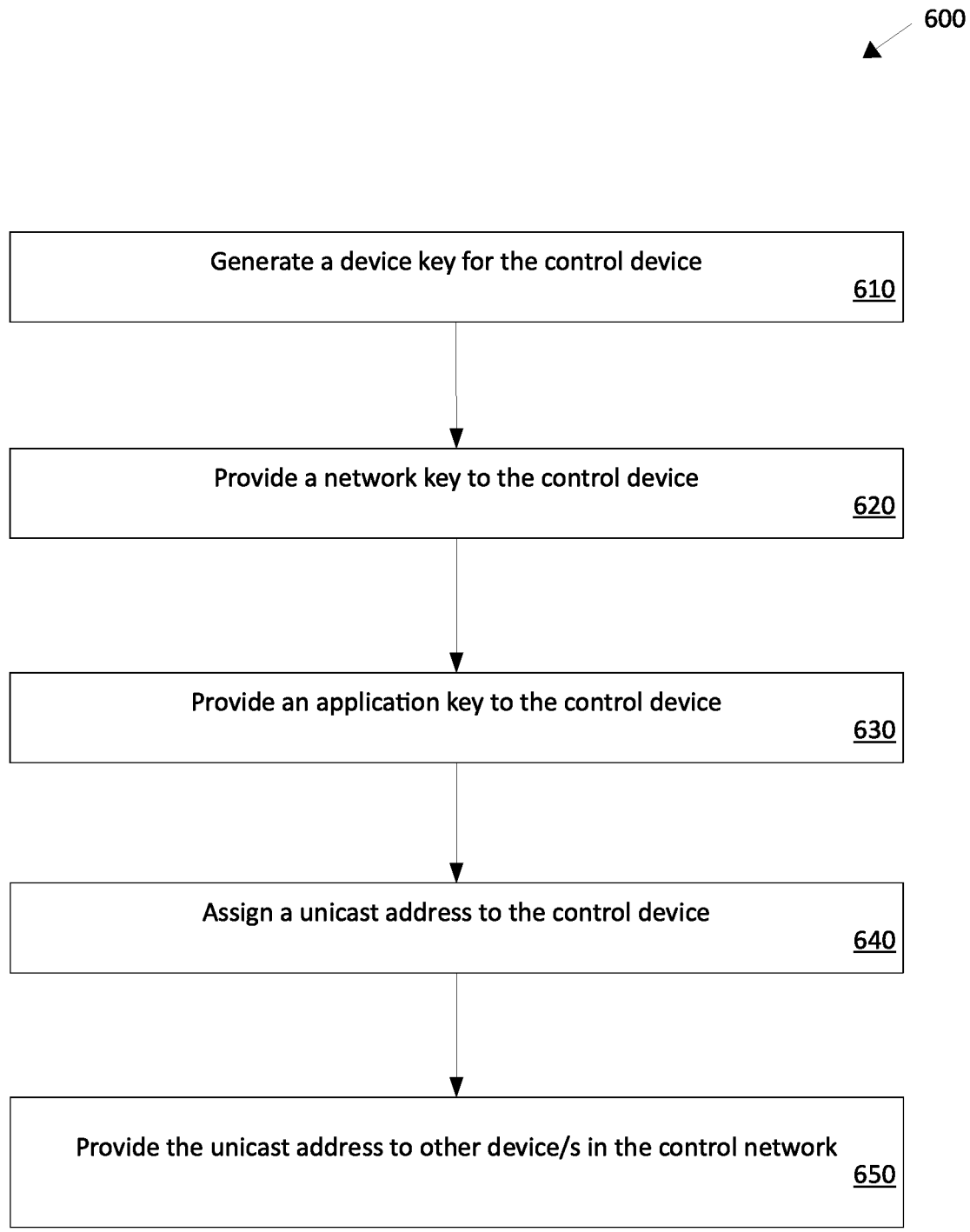
FIG. 6 illustrates an example method for adding a control device to a control network, according to one or more embodiments.

FIG. 6 illustrates an example method for adding a control device to a control network, according to one or more embodiments. Process 600 may be performed by one or more computing devices and/or processes thereof. For example, one or more blocks of process 600 may be performed by a computing device 850, such as but not limited to provisioning device 102 and/or provisioning device 312. In some embodiments, one or more blocks of process 600 are performed by an application executing on a mobile device. Process 600 will be described with respect to provisioning device 312, control device 324, a control network 350, and other member devices 326-332 of the control network 350 as an example, but is not limited to performance thereby.

At block 610, the provisioning device 312 generates a device key for the control device 324. The device key allows for secure communication between the provisioning device 312 and the control device 324 within the control network 350.

At block 620, the provisioning device 312 provides a network key to the control device 324. The network key is shared by all member devices 324-332 of the control network 350 and allows for communication between the member devices 324-332. At block 630, the provisioning device 312 provides an application key to the control device 324. The application key corresponds to a specific function of the control network 350 that the control device 324 has granted access to.

At block 640, the provisioning device 312 assigns a unicast address to the control device 324. The unicast address is a unique address within the control network 350. At block 650, the provisioning device 312 provides the unicast address to member devices 324-332 in the control network 350. The other member devices 326-332 may communicate with the control device 324 using the unicast address.

Hardware Diagram

Figure 7:
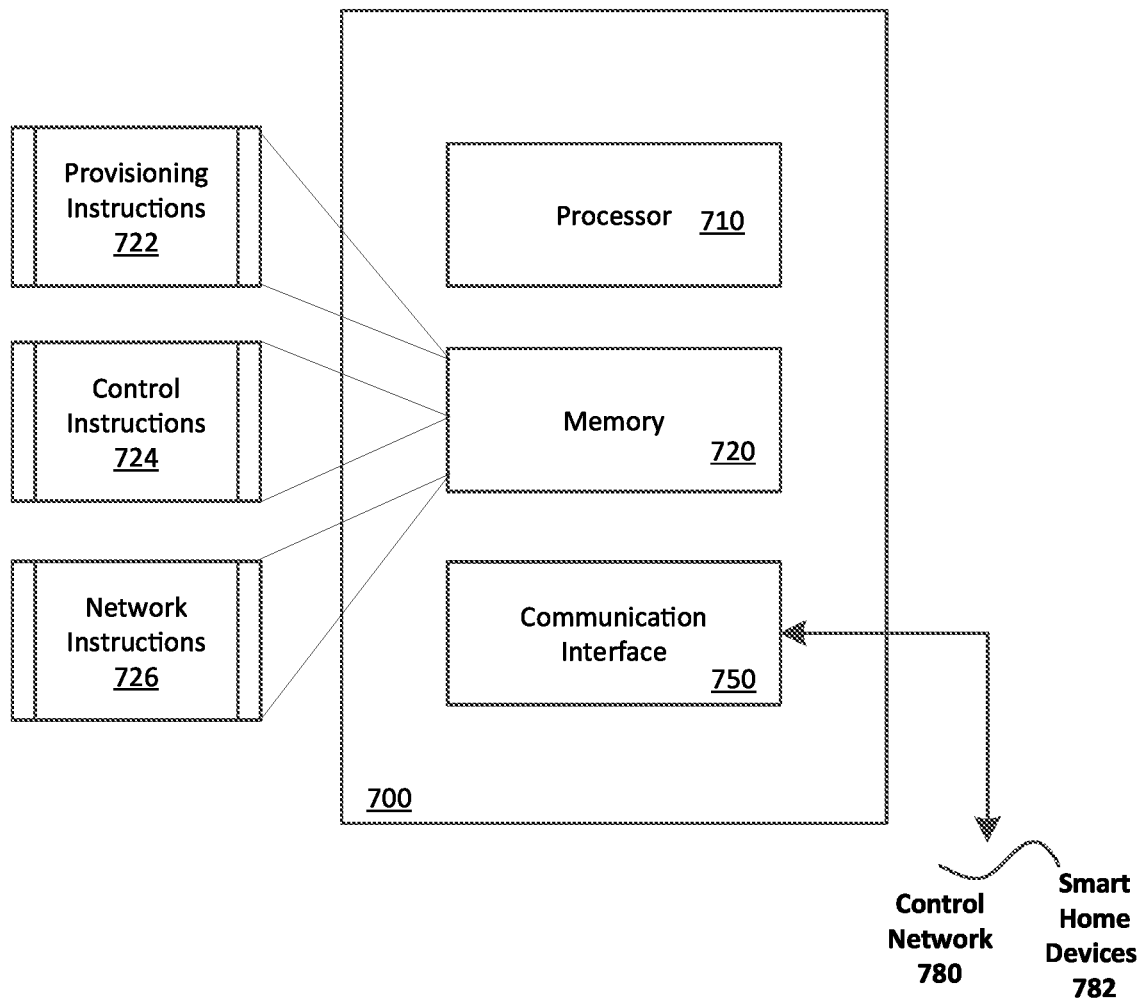
FIG. 7 is a simplified hardware diagram of a touch-based control device, according to one or more embodiments.

FIG. 7 is a simplified hardware diagram of a control device, according to one or more embodiments. A control device 700 can be implemented as an embodiment of other control devices 106, 200, 324-328, as described with various examples in this disclosure.

In one implementation, the control device 700 includes one or more processor 710, memory 720, and one or more communication interface(s) 750, such as one or more wireless transceivers (e.g., wireless transceiver 116, 304). The control device 700 includes at least one processor 710 for processing information stored in memory 720, such as provided by a random-access memory (RAM) or other dynamic storage device, for storing information and instructions which are executable by the processor 710.

As provided herein, one or more electronic components of a control device 700, such as but not limited to a printed circuit board (PCB), can comprise the processor 710, memory 720, communication interface 750, or any combination thereof as shown and described with respect to FIG. 7. In various embodiments, the electronic components may be or include a general-purpose microprocessor, a microcontroller, a combination of one or more microprocessors and/or microcontrollers acting in concert. The memory 720 may be used for storing temporary variables or other intermediate information during execution of instructions to be executed by the processor 710. The memory 720 may also include ROM or other static storage device/s for storing static information and instructions for the processor 710.

The communication interface(s) 750 can enable the control device 700 to communicate over one or more control networks 780 (e.g., Bluetooth, Zigbee, Wi-Fi, etc.) through use of one or more wireless network links. Using the network links, the control device 700 can communicate with one or more connected devices, user devices, other control devices, one or more servers, or third-party intermediary communication modules. The executable instructions in the memory 720 can include, for example, provisioning instructions 722, control instructions 724, network instructions 726, or other instructions executable by the processor 710.

As described herein, the control device 700 can be connected via a wired connection to one or more home devices (e.g., light elements), or can implement wireless network protocols to connect with smart home devices 782 via the control network 780 to transmit the control commands.

Figure 8:
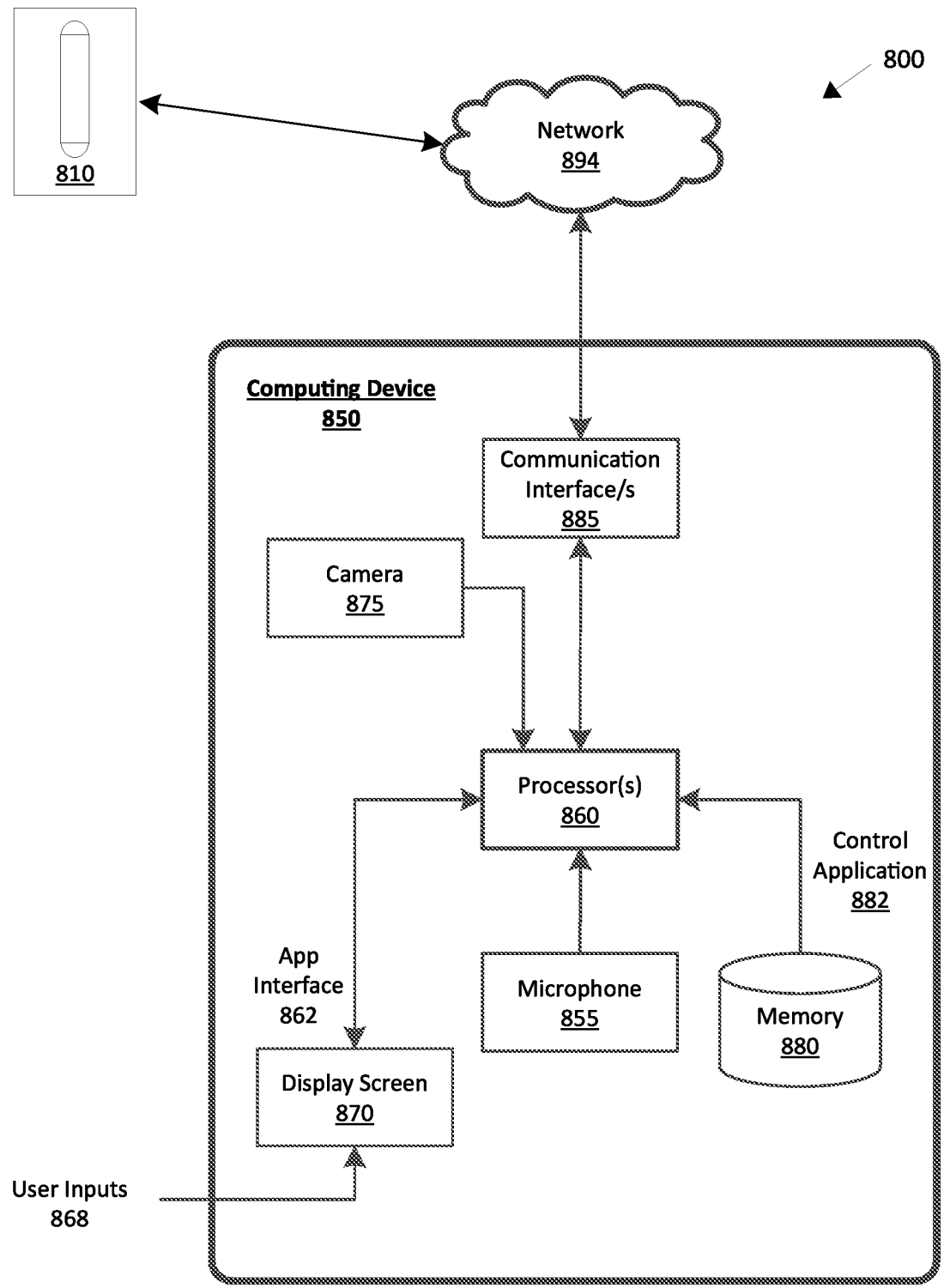
FIG. 8 is a simplified hardware diagram of a computing device, according to one or more embodiments.

FIG. 8 is a simplified hardware diagram of a computing device, according to one or more embodiments. A computing device 850 enables a user to provision and control one or more aspects of a control device 800, which may include one or more features of example control devices 106, 200, 324-328, as described with various embodiments. The computing device 850 may include a designated control application 882 that enables the computing device 850 to communicate with one or more control devices 800. Among other functions, the computing device 850 can operate to provision one or more control devices 800, such as to associate the control device/s 800 with an entity, dwelling, structure, user, account, control network, and the like.

The computing device 850 may comprise any computing device. In some implementations, the computing device 850 can comprise a mobile computing device, such as a smartphone, tablet computer, laptop computer, VR or AR headset device, and the like. As such, the computing device 850 can include typical telephony features such as a display screen 870, microphone 855, camera 875, and communication interface(s) 885 to communicate with external devices using any number of wireless communication protocols and over one or more networks 894. In certain aspects, the computing device 850 can store a designated application (e.g., a control application 882) in a local memory 880.

The configuration app 882 can be executed by a processor 860, which can cause an application interface 862 to be generated on the display screen 870 of the computing device 850. The application interface 862 can enable the user to, for example, present a user interface to scan one or more optical codes on a control device 810 using the camera 875, interpret the optical code to obtain a device identifier and a secret code, establish communication with the control device 810 associated with the device identifier using the secret code, and provision the control device 810. For example, the computing device 850 may provision the control device, such as by associating the control device/s 800 with an entity, dwelling, structure, user, account, control network, and the like.

Other Aspects of Disclosure

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A control device comprising:
a surface that is hidden by a faceplate after installation of the control device;
an optical code disposed on the surface, the optical code encoding a device identifier of the control device and an authentication code;
a wireless transceiver configured to communicate with a user device during a provisioning sequence of events that is initiated based on the user device scanning the optical code to obtain the device identifier and the authentication code, wherein the authentication code is usable to authenticate the user device with the control device after the control device is identified using the device identifier during the provisioning sequence of events; and
wherein upon authenticating the user device with the control device, the control device is included in a control network within a dwelling, the control network comprising a set of one or more other control devices and a set of connected devices that are controllable by the control device and the set of one or more other control devices; wherein the faceplate couples with a base assembly of the control device in order to hide the optical code, the optical code being visible prior to the coupling of the faceplate to the base assembly.

2. The control device of claim 1, wherein the surface is disposed on a base assembly of the control device.

3. The control device of claim 1, further comprising an exterior panel, wherein the exterior panel hides the surface when the control device is installed.

4. The control device of claim 1, wherein the optical code is a Quick Response (QR) code.

5. The control device of claim 1, wherein the wireless transceiver is a Bluetooth transceiver.

6. The control device of claim 1, further comprising logic configured to receive data from the user device after the provisioning sequence of events is carried out.

7. The control device of claim 1, further comprising control logic configured to:
receive wireless user input from the user device; and
generate signals to wirelessly control one or more connected devices in response to the user input using the wireless transceiver.

8. The control device of claim 1, further comprising control logic configured to:
receive user input from a user interface element of the control device; and
generate signals to wirelessly control one or more connected devices in response to the user input using the wireless transceiver.

9. The control device of claim 1, further comprising network logic configured to operate as a node in the control network after the provisioning sequence of events is carried out.

10. The control device of claim 1, wherein the control device comprises a wall-mountable switch.

11. A non-transitory computer-readable medium storing instructions that, when executed by a user device comprising one or more processors, causes the user device to:
present a user interface on the user device to scan one or more optical codes disposed on a surface of a control device, wherein the surface is hidden after installation of the control device;
scan an optical code disposed on the surface of the control device the optical code being visible prior to coupling of a faceplate on a base assembly;
interpret the optical code to obtain a device identifier and an authentication code required to provision the control device;
establish communication with the control device based on the device identifier and the authentication code; and
upon authenticating the control device with the user device, add the control device to a control network within a dwelling, the control network comprising a set of one or more other control devices and a set of connected devices that are controllable by the control device and the set of one or more other control devices;
wherein the optical code is hidden by the faceplate coupling to the base assembly and the faceplate covering the optical code.

12. The non-transitory computer-readable medium of claim 11, wherein the control network corresponds to a dwelling.

13. The non-transitory computer-readable medium of claim 11, wherein the control network is a Bluetooth mesh network comprising the set of one or more other control devices.

14. The non-transitory computer-readable medium of claim 13, wherein the instructions, when executed by the user device, further cause the user device to:
generate one or more keys for the control device; and
provide the one or more keys to the control device.

15. The non-transitory computer-readable medium of claim 14, wherein the one or more keys provided to the control device include:
an application key; and
a network key.

16. The non-transitory computer-readable medium of claim 14, wherein the instructions, when executed by the user device, further cause the user device to:
generate a unicast address for the control device; and
share the unicast address with one or more other devices in the control network.

17. The non-transitory computer-readable medium of claim 11, wherein establishing communication with the control device based on the device identifier and the authentication code comprises:
searching for the control device associated with the device identifier encoded by the optical code;
contacting the control device associated with the device identifier; and
providing the authentication code encoded by the optical code to the control device associated with the device identifier.

* * * * *